United States Patent
Kasik et al.

(10) Patent No.: US 7,578,191 B2
(45) Date of Patent: Aug. 25, 2009

(54) REACTOR JET PUMP SENSING LINE FREQUENCY MEASUREMENT

(75) Inventors: James Kasik, San Jose, CA (US); Swaminathan H. Sundaram, Cupertino, CA (US)

(73) Assignee: General Electric Company, Schenectady, NY (US)

( * ) Notice: Subject to any disclaimer, the term of this patent is extended or adjusted under 35 U.S.C. 154(b) by 357 days.

(21) Appl. No.: 11/644,003

(22) Filed: Dec. 22, 2006

(65) Prior Publication Data

US 2008/0148858 A1      Jun. 26, 2008

(51) Int. Cl.
*G01N 29/04* (2006.01)

(52) U.S. Cl. ........................................ 73/590
(58) Field of Classification Search ............. 73/590, 73/570, 579, 584, 649
See application file for complete search history.

(56) References Cited

U.S. PATENT DOCUMENTS

| | | | | |
|---|---|---|---|---|
| 3,860,480 A | * | 1/1975 | Carteus et al. | 376/245 |
| 4,039,376 A | * | 8/1977 | Wachter | 376/252 |
| 4,961,898 A | * | 10/1990 | Bogard et al. | 376/245 |
| 5,752,807 A | | 5/1998 | Erbes | |
| 6,233,301 B1 | | 5/2001 | Robergeau | |
| 6,435,839 B1 | | 8/2002 | Erbes | |

* cited by examiner

*Primary Examiner*—Helen C. Kwok
(74) *Attorney, Agent, or Firm*—Nixon & Vanderhye P.C.

(57) ABSTRACT

A frequency measuring device measures a natural frequency of a reactor jet pump sensing line supported by a sensing line support bracket in a nuclear reactor. The frequency measuring device includes a base member, a sensing line clamp attached to the base member that attaches to the sensing line support bracket, and at least one actuator attached to the base member. The actuator is positioned relative to the sensing line when the sensing line clamp is attached to the sensing line so that the actuator can strike the sensing line. A proximity probe attached to the base member measures vibration of the sensing line and outputs a vibration signal. A processor receives and processes the vibration signal from the proximity probe to determine the natural frequency.

17 Claims, 2 Drawing Sheets

REACTOR JET PUMP SENSING LINE FREQUENCY MEASUREMENT

BACKGROUND OF THE INVENTION

The present invention relates to an on-site impact test to measure the natural frequencies of reactor components.

As reactor recirculation pumps rotate, five vanes pass two cutwaters sequentially. Each time a vane passes the cutwater, the sudden change in fluid velocity causes pressure waves to be propagated upstream and downstream. Because the action of the two cutwaters occurs at exactly the same frequency, pressure waves from each cutwater add to form two pressure waves, one traveling upstream, and the other traveling downstream The frequency of these pressure waves is equal to the pump rotational speed times the number of vanes and is called the vane passing frequency (VPF). If the recirculation pump is operated such that the vane passing frequency coincides with the jet pump sensing line (JPSL) natural frequency, large amplification of sensing line motion will occur. If large amplification of the sensing line motion occurs due to near resonance of the sensing line natural frequency to the vane passing frequency, large vibration stresses are induced in the sensing line and sensing line support bracket welds. These large stresses may cause fatigue usage accumulation, eventually leading to crack initiation and crack propagation.

It is desirable to know the natural frequency of the JPSL accurately so that the plant can operate to avoid the VPF in that region or to install clamps to move the JPSL natural frequency above the maximum VPF.

JPSL susceptible to fatigue failure has been identified with finite element (FE) analyses. The FE model of the JPSL was developed and qualified using test data. The qualified FE model was then used to determine the natural frequencies of the JPSLs. Considering the specified tolerances on the JPSL lengths, calculations are made for each sensing line, one with nominal dimensions, and the others with the largest and shortest unsupported spans considering tolerances. The JPSL natural frequencies are determined using these models. The calculations, however, are time-consuming and cannot predict the natural frequency precisely due to the variation in the as-built lengths and weld sizes of the JPSLs. Sometimes, the lines are bent during construction.

BRIEF DESCRIPTION OF THE INVENTION

In an exemplary embodiment of the invention, a frequency measuring device measures a natural frequency of a reactor jet pump sensing line supported by a sensing line support bracket in a nuclear reactor. The frequency measuring device includes a base member, a sensing line clamp attached to the base member that attaches to the sensing line support bracket, and at least one solenoid attached to the base member. The solenoid is positioned relative to the sensing line when the sensing line clamp is attached to the sensing line so that the solenoid can strike the sensing line. A proximity probe attached to the base member measures vibration of the sensing line and outputs a vibration signal. A processor receives and processes the vibration signal from the proximity probe.

In another exemplary embodiment of the invention, a method of measuring a natural frequency of a reactor jet pump includes the steps of lowering a frequency measuring device into the reactor; attaching a sensing line clamp to the sensing line support bracket; striking the sensing line with at least one solenoid; measuring vibration of the sensing line and outputting a vibration signal; and receiving and processing the vibration signal.

In still another exemplary embodiment of the invention, a frequency measuring device measures a natural frequency of a vibratory member supported by a support bracket. The frequency measuring device includes a base member, a bracket clamp attached to the base member that attaches to the support bracket, and at least one solenoid attached to the base member. The solenoid is positioned relative to the vibratory member when the bracket clamp is attached to the support bracket so that the solenoid can strike the vibratory member. A proximity probe attached to the base member measures vibration of the vibratory member and outputs a vibration signal. A processor receives and processes the vibration signal from the proximity probe

DETAILED DESCRIPTION OF THE INVENTION

The jet pumps are located in the annual between the core shroud and the reactor vessel wall. Each pair of jet pumps is supplied a driving force from the recirculation pump. The driving force is distributed to eight to twelve jet pumps. The flow is sensed in the jet pump via a pressure tap that is monitored outside of the reactor vessel.

Each jet pump assembly is composed of two jet pumps. Each jet pump includes of an inlet mixer 10, a nozzle assembly 11, a diffuser 12 and a sensing line 13. The sensing line is held off the diffuser by a set of standoffs 14.

Figure 1:
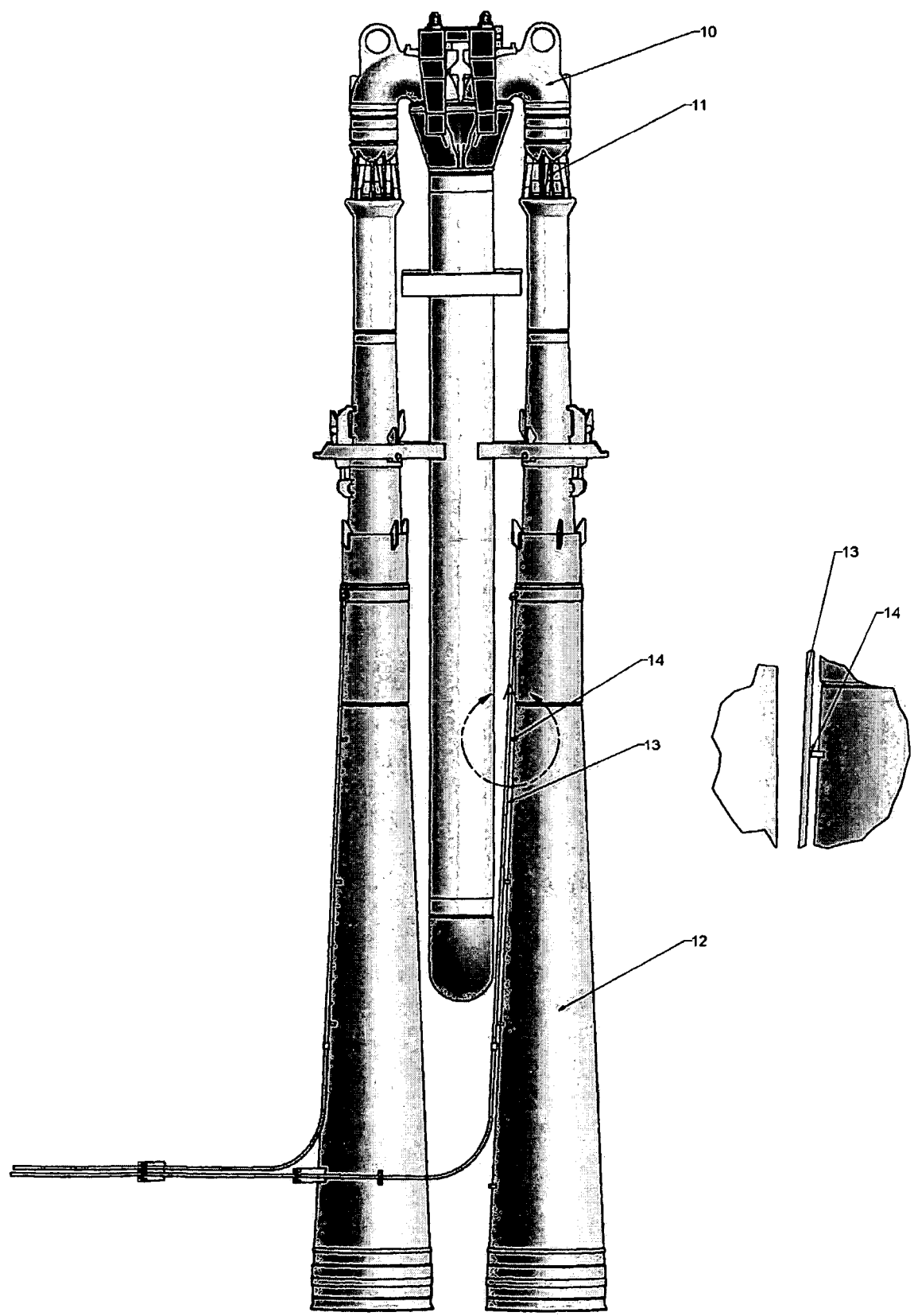
FIG. 1 illustrates a reactor jet pump including the reactor jet pump sensing line.
Figure 2:
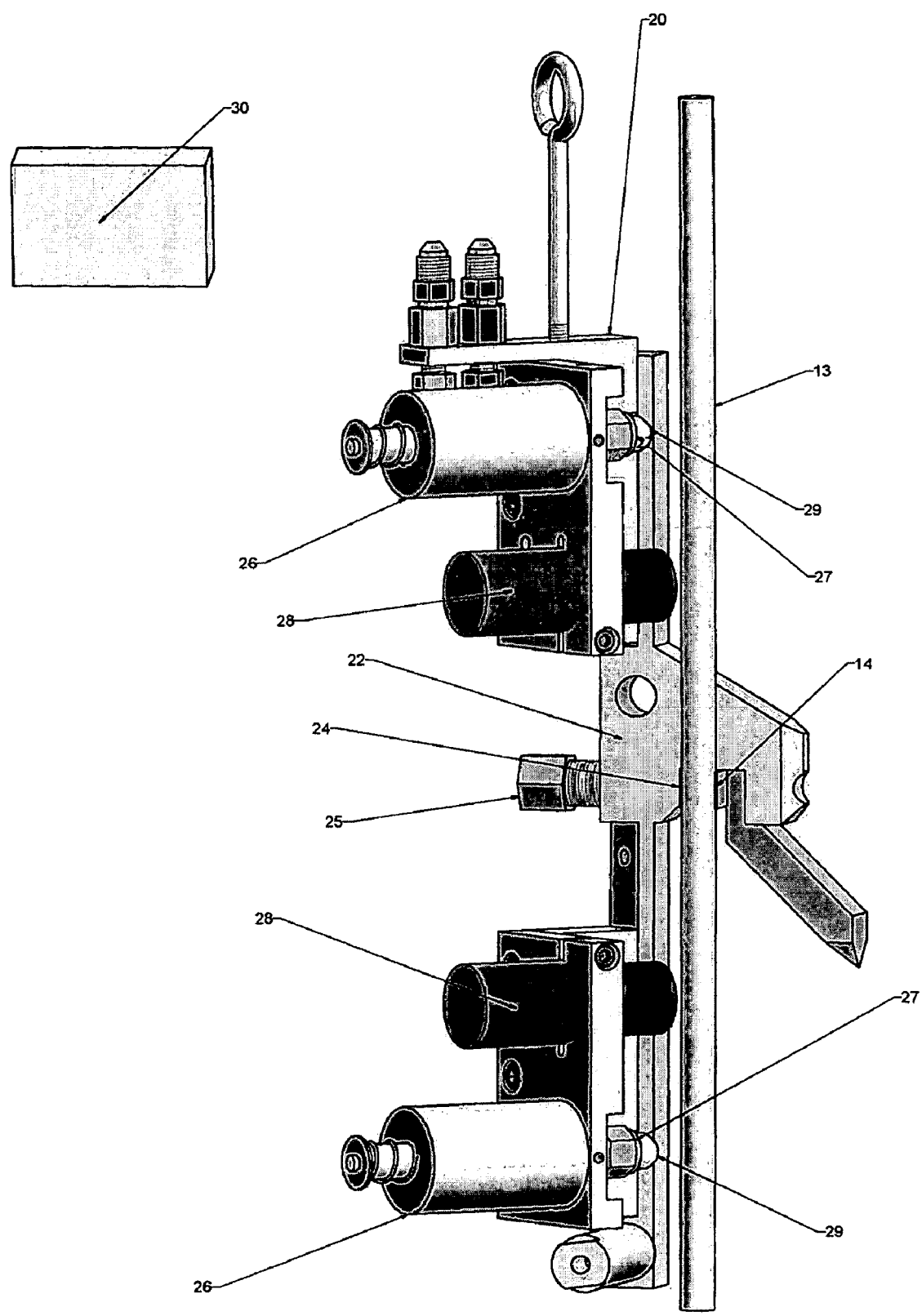
FIG. 2 shows a frequency measuring device for measuring a natural frequency of a reactor jet pump sensing line.

FIG. 2 illustrates a frequency measuring tool 20 for measuring a natural frequency of the reactor jet pump sensing line 13. The device 20 includes a base member 22, such as a stamped aluminum plate or the like, that supports the operating components of the device 20. A sensing line clamp 24 attaches the device 20 to the sensing line standoff 14. The sensing line clamp preferably hydraulically clamps to the sensing line standoff 14. At least one actuator or solenoid 26 and a proximity probe 28, preferably two as shown, are positioned relative to the sensing line 13 when the sensing line clamp 24 is attached to the sensing line 13 so that the electric solenoid 26 can strike the sensing line 13. The electric solenoid 26 has an impact probe 27 and a strike tip 29. When an electric pulse is sent to the electric solenoid 26, the impact probe 27 and the strike tip 29 travel forward and strike the sensing line 13. The impact probe 27 senses the force with which the sensing line 13 was struck.

The proximity probe 28 is attached to the base member 22 and measures the vibration of the sensing line 13. The proximity probe 28 outputs an electronic signal to a processor 30 that processes and records the electronic signal. The impact probe 27 starts the recording and analysis of the electronic signal.

It is desirable to have two sensors to measure the sensing line vibration in the tangential and radial directions. The space constraints inside the annulus region, however, do not permit the use of two proximity probes 28 in the proper orientation. As a consequence, the proximity probe 28 is positioned at an orientation of about 45° from the radial direction, which can determine the natural frequency of the sensing line in both directions. By impacting the sensing line at 45°, modes in both directions are excited and measured by the probe.

The signal is processed in the processor by the use of experimental modal analysis software. The time input force and time response are recorded. From these, a Frequency Response Function and coherence function are calculated. The peaks in the response of the Frequency Response Function indicate the natural frequencies of the structure.

The design of the remotely operated tool 20 is dependent on the location of the jet pump sensing line 13 to be tested and the space of the annulus region. The tool 20 is remotely lowered about 100 feet under water in the reactor and clamped onto the sensing line support bracket, without touching the sensing line 13 itself. A hydraulic cylinder 25 attaches the tool 20 to the stand-off bracket 14 of the sensing line 13. Once positioned, the solenoid actuator or actuators 26 are remotely activated to strike the sensing line 13 and cause excitation. The proximity probe 28 measures vibration of the sensing line in both tangential and radial directions.

The tool itself could oscillate during the impact thus leading to the sensing line vibrations being mixed up with the tool vibrations in the output signal. For this purpose accelerometers may be installed on the tool to measure its vibration frequency, and this frequency is subtracted from the signal, if significant.

With the tool and method described herein, the natural frequency of the jet pump sensing line can be accurately determined, and plant operation can be tailored to avoid matching the vane passing frequency with the discovered natural frequency. Alternatively, clamps or the like may be installed to move the sensing line natural frequency above the maximum vane passing frequency, thereby preventing large vibration stresses from being induced in the sensing line and sensing line support bracket welds.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims. For example, modifications of this tool can be used to measure the natural frequency of other components, such as the jet pump riser brace.

What is claimed is:

1. A frequency measuring device for measuring a natural frequency of a reactor jet pump sensing line supported by a sensing line support bracket in a nuclear reactor, the frequency measuring device comprising:
    a base member;
    a sensing line clamp attached to the base member that attaches to the sensing line support bracket;
    at least one solenoid attached to the base member, the solenoid including an impact member that is displaceable by the solenoid into contact with the sensing line, wherein the solenoid and the impact member are positioned relative to the sensing line when the sensing line clamp is attached to the sensing line so that the impact member can strike the sensing line;
    a proximity probe attached to the base member, the proximity probe measuring vibration of the sensing line and outputting a vibration signal; and
    a processor receiving and processing the vibration signal from the proximity probe.

2. A frequency measuring device according to claim 1, wherein the proximity probe is positioned at an orientation of about 45 degrees from a reactor radial direction.

3. A frequency measuring device according to claim 1, comprising at least two solenoids.

4. A frequency measuring device according to claim 1, wherein the solenoid is operable via remote control.

5. A method of measuring a natural frequency of a reactor jet pump sensing line supported by a sensing line support bracket in a nuclear reactor, the method comprising:
    lowering a frequency measuring device into the reactor;
    attaching a sensing line clamp to the sensing line support bracket, thereby positioning at least one solenoid adjacent the sensing line, the solenoid including an impact member that is displaceable by the solenoid into contact with the sensing line;
    advancing the impact member by the solenoid into contact with the sensing line;
    measuring vibration of the sensing line and outputting a vibration signal; and
    receiving and processing the vibration signal.

6. A method according to claim 5, wherein the measuring step is practiced by measuring vibration in a reactor tangential direction and a reactor radial direction.

7. A method according to claim 5, wherein the striking step is practiced by remotely activating at least one solenoid.

8. A frequency measuring device for measuring a natural frequency of a vibratory member supported by a support bracket, the frequency measuring device comprising:
    a base member;
    a bracket clamp attached to the base member that attaches to the support bracket;
    at least one solenoid attached to the base member, the solenoid including an impact member that is displaceable by the solenoid into contact with the vibratory member, wherein the solenoid and the impact member are positioned relative to the vibratory member when the bracket clamp is attached to the support bracket so that the impact member can strike the vibratory member;
    a proximity probe attached to the base member, the proximity probe measuring vibration of the vibratory member and outputting a vibration signal; and
    a processor receiving and processing the vibration signal from the proximity probe.

9. A frequency measuring device according to claim 8, wherein the proximity probe is positioned at an orientation of about 45 degrees relative to an orientation of the vibratory member.

10. A frequency measuring device according to claim 8, comprising at least two solenoids.

11. A frequency measuring device according to claim 8, wherein the solenoid is operable via remote control.

12. A frequency measuring device according to claim 8, wherein the vibratory member is a reactor jet pump sensing line.

13. A frequency measuring device according to claim 8, wherein the vibratory member is a riser brace.

14. A frequency measuring device according to claim 1, wherein the impact member comprises an impact probe and a strike tip, wherein the strike tip impacts the sensing line when the impact member is advanced by the solenoid.

15. A frequency measuring device according to claim 14, wherein the impact probe senses the force with which the sensing line is struck.

16. A frequency measuring device according to claim 8, wherein the impact member comprises an impact probe and a strike tip, wherein the strike tip impacts the sensing line when the impact member is advanced by the solenoid.

17. A frequency measuring device according to claim 16, wherein the impact probe senses the force with which the sensing line is struck.

* * * * *